(12) United States Patent
Kawaguchi

(10) Patent No.: US 7,875,344 B2
(45) Date of Patent: Jan. 25, 2011

(54) STEEL-PLATE-REINFORCEMENT RESIN COMPOSITION, STEEL PLATE REINFORCING SHEET, AND REINFORCING METHOD OF STEEL PLATE

(75) Inventor: Yasuhiko Kawaguchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 237 days.

(21) Appl. No.: 10/977,947

(22) Filed: Nov. 1, 2004

(65) Prior Publication Data
US 2005/0103422 A1   May 19, 2005

(30) Foreign Application Priority Data
Nov. 4, 2003   (JP)   ............................ 2003-374195

(51) Int. Cl.
*B32B 5/20* (2006.01)
*B32B 5/24* (2006.01)
*B32B 5/30* (2006.01)

(52) U.S. Cl. ............... 428/317.7; 428/304.4; 428/317.9; 428/319.3

(58) Field of Classification Search ............... 428/304.4, 428/317.7, 317.9, 319.3
See application file for complete search history.

(56) References Cited

U.S. PATENT DOCUMENTS

| | | | |
|---|---|---|---|
| 5,151,327 A | | 9/1992 | Nishiyama et al. |
| 5,198,286 A | * | 3/1993 | Kagoshima et al. ......... 442/370 |
| 5,274,006 A | | 12/1993 | Kagoshima et al. |
| 5,550,190 A | * | 8/1996 | Hasegawa et al. ......... 525/92 A |
| 5,755,486 A | | 5/1998 | Wycech |
| 6,165,588 A | | 12/2000 | Wycech |
| 6,333,102 B1 | * | 12/2001 | Kim et al. ................. 428/319.1 |
| 6,455,126 B1 | | 9/2002 | Wycech |
| 6,521,706 B1 | * | 2/2003 | Desai et al. ................. 525/111 |
| 2003/0186049 A1 | * | 10/2003 | Czaplicki et al. ....... 428/355 EP |
| 2003/0235675 A1 | | 12/2003 | Wycech |
| 2004/0266899 A1 | * | 12/2004 | Muenz et al. ................ 521/135 |

FOREIGN PATENT DOCUMENTS

CN   1187792 A   7/1998

(Continued)

OTHER PUBLICATIONS

Database WPI: Section Ch, Week 20138, Derwent Publications Ltd., London, GB, which includes the Abstract of JP 03 180342 B2.

*Primary Examiner*—Michael A Tolin
(74) *Attorney, Agent, or Firm*—Jean C. Edwards, Esq.; Akerman Senterfitt

(57) ABSTRACT

Steel-plate-reinforcement resin composition that can provide improvement in both of adhesiveness and handleability in a wide temperature range around room temperature, a steel plate reinforcing sheet using the steel-plate-reinforcement resin composition, and a method of reinforcing the steel plate using the steel plate reinforcing sheet. After the steel-plate-reinforcement resin composition comprising an epoxy resin, an acrylonitrile-butadiene rubber, a curing agent, and a foaming agent is prepared, the steel-plate-reinforcement resin composition is rolled to form a resin layer 2. Then, a reinforcing layer 1 is laminated on the resin layer 1 to obtain a steel plate reinforcing sheet. After the steel plate reinforcing sheet is adhesively bonded to a steel plate 4, the steel plate reinforcing sheet is foamed and cured, to reinforce the steel plate 4.

10 Claims, 1 Drawing Sheet

FOREIGN PATENT DOCUMENTS

| | | |
|---|---|---|
| DE | 10163253 A1 * | 7/2003 |
| EP | 0500009 | 8/1992 |
| EP | 1 361 259 | 11/2003 |
| JP | 56-45927 | 4/1981 |
| JP | 4-202318 | 7/1992 |
| JP | 4-264142 | 9/1992 |
| JP | 4-336241 | 11/1992 |
| JP | HEI. 07-068695 | 3/1995 |
| JP | 2002-283526 | 10/2002 |
| WO | WO 97/12929 | 4/1997 |
| WO | WO 99-35197 | 7/1999 |
| WO | WO 99/41468 | 8/1999 |
| WO | WO 99/55793 | 11/1999 |
| WO | WO 96/37400 | 6/2001 |

* cited by examiner

STEEL-PLATE-REINFORCEMENT RESIN COMPOSITION, STEEL PLATE REINFORCING SHEET, AND REINFORCING METHOD OF STEEL PLATE

BACKGROUND OF THE INVENTION

1. Field of the Invention

The present invention relates to a steel-plate-reinforcement resin composition, a steel plate reinforcing sheet, and a reinforcing method of a steel plate. More particularly, the present invention relates to a steel-plate-reinforcement resin composition, adhesively bonded to a steel plate used in a variety of industrial machines such as transportation machines, for reinforcing the steel plate, a steel plate reinforcing sheet, and a method of reinforcing the steel plate using the steel plate reinforcing sheet.

2. Description of the Prior Art

In general, a steel plate for a shell of an automotive vehicle is manufactured in the form of a thin sheet having a thickness generally in the range of 0.6 mm to 0.8 mm, for reduction in weight of a vehicle body. Accordingly, the steel plate is reinforced by adhesively bonding a steel plate reinforcing sheet to the inside of the steel plate.

Epoxy resin composition in the form of a sheet is known as the steel plate reinforcing sheet. For example, JP Laid-open (Unexamined) Patent Publication No. 2002-283526 proposes a thermally curable adhesive sheet for reinforcing a thin steel plate having a structure wherein uncured adhesive layers of epoxy resin composition having adhesiveness at room temperature and containing a thermally decomposable foaming agent are laminated in layers on a base material layer of uncured epoxy resin composition.

When the epoxy resin composition is formed in a sheet form, a liquid epoxy resin and a solid epoxy resin are mixed in a proportion so that the epoxy resin composition in the form of a sheet develops adhesiveness at about room temperature.

However, it is very difficult to satisfy both of adhesiveness and handleability of the epoxy resin composition in the form of a sheet at about room temperature, e.g., in a relatively wide temperature range of 5-35° C.

Allowing the epoxy resin composition to develop good adhesiveness at low temperature of about 5° C. requires a further increased ratio of the liquid epoxy resin, while however, such a further increased ratio of the liquid epoxy resin makes the epoxy resin composition to too sticky paste at high temperature of about 40° C., making it hard to strip the epoxy resin composition in the form of the sheet from a separator and thus causing inconvenience to the handleability.

On the other hand, allowing the epoxy resin composition to develop good adhesiveness at high temperature of about 40° C. requires an increased ratio of the solid epoxy resin, while however, such an increased ratio of the solid epoxy resin produces the disadvantage that the epoxy resin composition does not develop the good adhesiveness at low temperature of about 5° C.

SUMMARY OF THE INVENTION

It is the object of the invention to provide a steel-plate-reinforcement resin composition that can provide improvement in both of adhesiveness and handleability in a wide temperature range around room temperature, a steel plate reinforcing sheet using the steel-plate-reinforcement resin composition, and a method of reinforcing the steel plate using the steel plate reinforcing sheet.

The present invention provides a steel-plate-reinforcement resin composition comprising an epoxy resin, an acrylonitrile-butadiene rubber, a curing agent, and a foaming agent.

In the steel-plate-reinforcement resin composition, it is preferable that a weight ratio between the epoxy resin and the acrylonitrile-butadiene rubber is in the range of 70:30 to 95:5.

In the steel-plate-reinforcement resin composition, it is preferable that the curing agent is a thermally curable curing agent.

In the steel-plate-reinforcement resin composition, it is preferable that the foaming agent is a thermally decomposable foaming agent.

Preferably, the steel-plate-reinforcement resin composition further comprises a low polar rubber.

The present invention covers a steel plate reinforcing sheet comprising a resin layer of the above-said steel-plate-reinforcement resin composition and a reinforcing layer laminated on the resin layer.

Further, the present invention covers a steel plate reinforcing method wherein the above-said steel plate reinforcing sheet is adhesively bonded to the steel plate, the steel plate reinforcing sheet is foamed and cured.

According to the steel-plate-reinforcement resin composition and the steel plate reinforcing sheet of the present invention, the steel-plate-reinforcement resin composition can allow the development of the good adhesiveness in a wide temperature range around room temperature, for the adhesive bonding to the steel plate. Accordingly, the steel plate reinforcing method of the present invention enables the steel plate to be surely reinforced while providing improved handleability in a wide temperature range of about room temperature.

DETAILED DESCRIPTION OF THE PREFERRED EMBODIMENT

Figure 1:
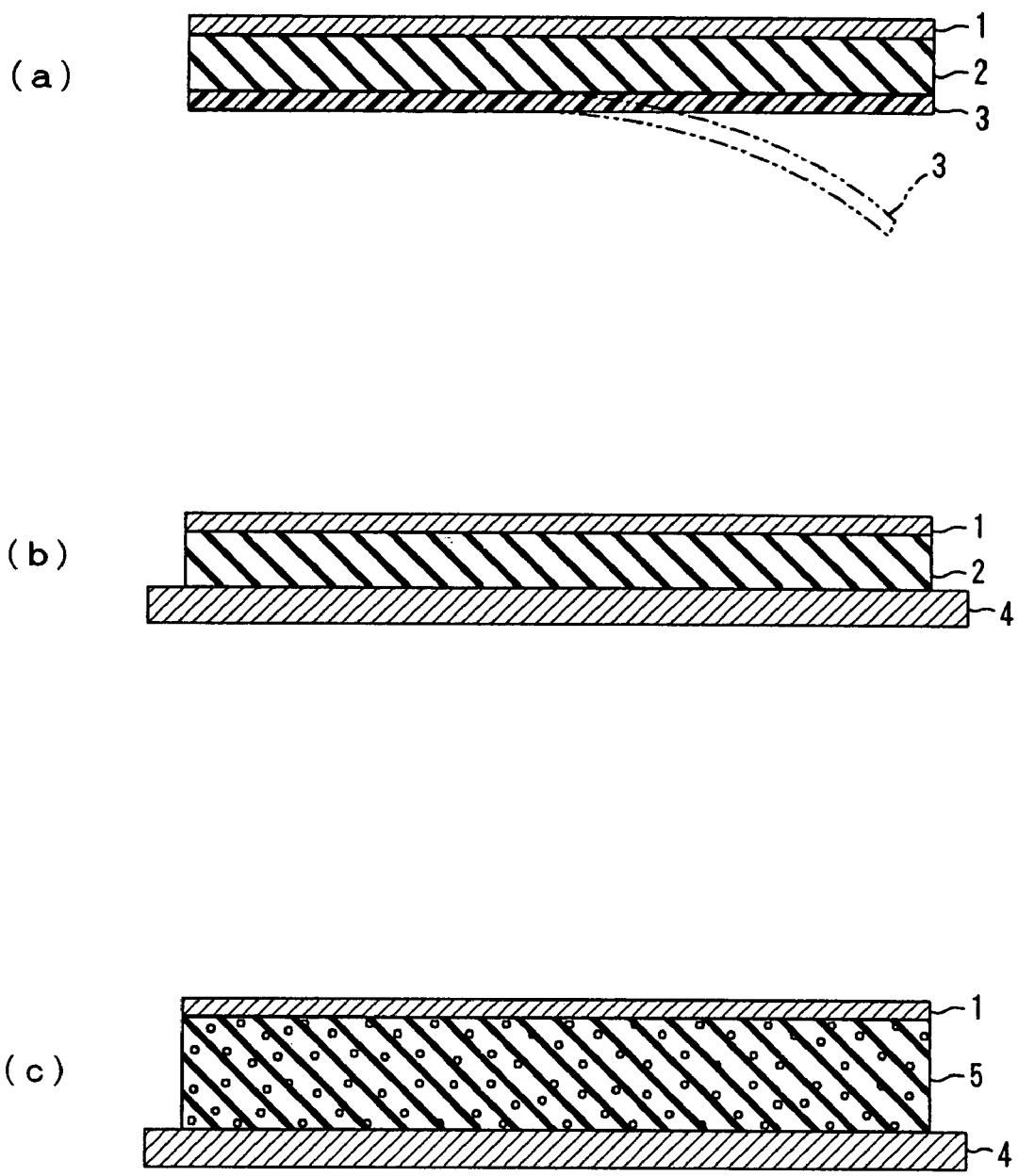
FIG. 1 is a process drawing showing an embodiment of a method of reinforcing a steel plate by using a steel plate reinforcing sheet of the present invention:
(a) illustrates the process of preparing a steel plate reinforcing sheet and peeling off an separator (release liner) from the same reinforcing sheet;
(b) illustrates the process of adhesively bonding the steel plate reinforcing plate to the steel plate; and
(c) illustrates the process of foaming and curing the steel plate reinforcing plate by heating.

A steel-plate-reinforcement resin composition (A resin composition for reinforcing a steel plate) of the present invention comprises an epoxy resin, an acrylonitrile-butadiene rubber, a curing agent, and a foaming agent.

In the present invention, the epoxy resins that may be used include, for example, ring containing nitrogen epoxy resin, such as bisphenol A type epoxy resin, bisphenol F type epoxy resin, phenol novolak epoxy resin, cresol novolak epoxy resin, cyclo aliphatic epoxy resin, triglycidyl isocyanurate, and hydantoin epoxy resin, hydrogenated bisphenol A type epoxy resin, aliphatic epoxy resin, glycidyl ether epoxy resin, bisphenol S type epoxy resin, biphenyl epoxy resin, dicyclo ring type epoxy resin, and naphthalene epoxy resin.

These may be used alone or in combination. Of these epoxy resins, bisphenol A type epoxy resin is preferably used.

Also, the epoxy resin whose epoxy equivalent is for example in the range of 180-340 g/eq., which is in a liquid form at room temperature, and whose viscosity is not more than 250 dPa·s/25° C. to allow the good adhesiveness to develop at low temperature is preferably used.

In the present invention, the acrylonitrile-butadiene rubber (NBR: acrylonitrile-butadiene copolymer) is synthetic rubber produced by emulsion polymerization of acrylonitrile and butadiene. No particular limitation is imposed on the acrylonitrile-butadiene rubber used. The acrylonitrile-butadiene rubber that may be used include, for example, the one in which a carboxyl group is introduced and the one partly crosslinked by sulfur or metal oxide. The acrylonitrile-butadiene rubber is solid rubber, and is good in compatibility with the epoxy resin. Due to this, the containing of the acrylonitrile-butadiene rubber can provide improved adhesiveness, handleability and reinforcing effect in a wide temperature range of about room temperature. The acrylonitrile-butadiene rubber containing 10-50 weight % acrylonitrile is preferably used. Also, the acrylonitrile-butadiene rubber having the Mooney viscosity of not less than 25 is preferably used.

It is preferable that the acrylonitrile-butadiene rubber has a weight ratio of the epoxy resin to the acrylonitrile-butadiene rubber (epoxy resin: acrylonitrile-butadiene rubber) is between 70:30 and 95:5, or preferably between 75:25 and 92:8. When the weight ratio of the acrylonitrile-butadiene rubber is more than 30%, there is a possibility that the reinforcing effect may reduce. On the other hand, when the weight ratio of the acrylonitrile-butadiene rubber is less than 5%, there is a possibility that the viscosity of the steel-plate-reinforcement resin composition may reduce excessively to cause reduction in handleability. In contrast to this, the containing of the acrylonitrile-butadiene rubber having the above-said range of the weight ratio can allow the development of the good adhesiveness at low temperature caused by the good compatibility with the epoxy resin, and can also allow the development of the good cohesiveness at high temperature caused by the acrylonitrile-butadiene rubber of the solid rubber, thus producing good handleability and good reinforcing effect.

In the present invention, a thermally curable curing agent that is cured by heating is preferably used as the curing agent. The curing agents that may be used include, for example, amine compounds, acid anhydride compounds, amide compounds, hydrazide compounds, imidazole compounds, and imidazoline compounds. In addition to these, phenol compounds, urea compounds, and polysulfide compounds can be cited as the curing agent.

The amine compounds that may be used include, for example, ethylenediamine, propylenediamine, diethylenetriamine, triethylenetetramine, amine adducts thereof, metaphenylenediamine, diaminodiphenylmethane, and diaminodiphenylsulfone.

The acid anhydride compounds that may be used include, for example, phthalic anhydride, maleic anhydride, tetrahydrophthalic anhydride, hexahydrophthalic anhydride, methyl nadic anhydride, pyromellitic anhydride, dodecenylsuccinic anhydride, dichlorosuccinic anhydride, benzophenonetetracarboxylic anhydride, and chlorendic anhydride.

The amide compounds that may be used include, for example, dicyandiamide and polyamide.

The hydrazide compounds that may be used include, for example, adipic dihydrazide.

The imidazole compounds that may be used include, for example, methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

The imidazoline compounds that may be used include, for example, methylimidazoline, 2-ethyl-4-methylimidazoline, ethylimidazoline, isopropylimidazoline, 2,4-dimehtylimidazoline, phenylimidazoline, undecylimidazoline, heptadecylimidazoline, and 2-phenyl-4-methyl imidazoline.

These may be used alone or in combination. Of these curing agents, dicyandiamide is preferably used in terms of adhesiveness.

The mixing ratio of the curing agent is for example in the range of 0.5-50 parts by weight, or preferably 1-40 parts by weight, per 100 parts by weight of the total of the epoxy resin and the acrylonitrile-butadiene rubber, though it depends on an equivalent ratio between the curing agent and the epoxy resin used.

In addition to the curing agent, a curing accelerator may be mixed, if required. The curing accelerators that may be used include, for example, imidazoles, ureas, tertiary amines, phosphorus compounds, quaternary ammonium salts, and organic metal salts. These may be used alone or in combination. The mixing ratio of the curing accelerator is for example in the range of 0.1-10 parts by weight, or preferably 0.2-5 parts by weight, per 100 parts by weight of the total of the epoxy resin and the acrylonitrile-butadiene rubber.

In the present invention, a thermally decomposable foaming agent that is foamed by the thermal decomposition is preferably used. The thermally decomposable foaming agents that may be used include, for example, an inorganic foaming agent and an organic foaming agent.

The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, an N-nitroso compound (N,N'-dinitrosopentamethylenetetramine, N,N'-dimethyl-N,N'-dinitrosoterephthalamide, etc.), an azoic compound (e.g. azobis isobutyronitrile, azodicarbonamide, barium azodicarboxylate, etc.), alkane fluoride (e.g. trichloromonofluoromethane, dichloromonofluoromethane, etc.), a hydrazine compound (e.g. paratoluene sulfonyl hydrazide, diphenylsulfone-3,3'-disulfonyl hydrazide, 4,4'-oxybis (benzene sulfonyl hydrazide) (OBSH), allylbis(sulfonyl hydrazide), etc.), a semicarbazide compound (e.g. p-toluylenesulfonyl semicarbazide, 4,4'-oxybis(benzene sulfonyl semicarbazide, etc.), and a triazole compound (e.g. 5-morphoryl-1,2,3,4-thiatriazole, etc.).

The foaming agents may be in the form of thermally expansible microparticles comprising thermally expansive material (e.g. isobutane, pentane, etc.) which is encapsulated in a microcapsule (e.g. a microcapsule of thermoplastic resin, such as vinylidene chloride, acrylonitrile, acrylic ester and methacrylic ester). Commercially available products, such as Microsphere® (available from Matsumoto Yushi-Seiyaku Co., Ltd.), may be used as the thermally expansible microparticles.

These may be used alone or in combination. Of these foaming agents, 4,4'-oxybis(benzene sulfonyl hydrazide) is preferably used in terms of less susceptible to external factors and stable foaming.

The mixing ratio of the foaming agent is for example in the range of 0.1-30 parts by weight, or preferably 0.5-20 parts by weight, per 100 parts by weight of the total of the epoxy resin and the acrylonitrile-butadiene rubber.

In addition to the foaming agent, a foam auxiliary agent may also be used, if required. The foam auxiliary agents that may be used include, for example, zinc stearate, a urea compound, a salicyclic compound, and a benzoic compound. These foam auxiliary agents may be used alone or in combination. The mixing ratio of the foam auxiliary agent is for example in the range of 0.1-10 parts by weight, or preferably 0.2-5 parts by weight, per 100 parts by weight of the total of the epoxy resin and the acrylonitrile-butadiene rubber.

Preferably, this steel-plate-reinforcement resin composition includes a filler and a low polar rubber, in addition to the components cited above. The addition of the filler can produce an improved reinforcement effect. Also, the addition of the low polar rubber can produce improvement in adhesion to an oiled surface of the steel plate when oil and the like adheres thereto.

The fillers that may be used include, for example, calcium carbonate (e.g. calcium carbonate heavy, calcium carbonate light, and Hakuenka® (colloidal calcium carbonate), etc.), talc, mica, clay, mica powder, bentonite, silica, alumina, aluminum silicate, titanium oxide, carbon black, acetylene black, and aluminum powder. These may be used alone or in combination. The mixing ratio of the filler is for example in the range of 10-500 parts by weight, or preferably 50-300 parts by weight, per 100 parts by weight of the total of the epoxy resin and the acrylonitrile-butadiene rubber.

The low polar rubber is a rubber that contains no polar group such as an amino group, a carboxyl group, and a nitrile group in the molecule. For example, solid or liquid synthetic rubbers including, for example, styrene-butadiene rubber, butadiene rubber, polybutene rubber, and synthetic natural rubber can be cited as the low polar rubber. These may be used alone or in combination. The mixing ratio of the low polar rubber is for example in the range of 1-100 parts by weight, or preferably 5-70 parts by weight, per 100 parts by weight of the total of the epoxy resin and the acrylonitrile-butadiene rubber.

Further, this steel-plate-reinforcement resin composition may include, in addition to the components cited above, known additives such as a tackifier (e.g. rosin resin, terpene resin, coumarone-indene resin, petroleum resin, etc.), pigment (e.g. carbon black, etc.), a thixotropic agent (e.g. montmorillonite, etc.), lubricant (e.g. stearic acid, etc.), an antiscorching agent, a stabilization agent, a softening agent, a plasticizer, an antiaging agent, an antioxidant, an ultraviolet absorber, a coloring agent, a mildewproofing agent, and a fire retardant, if required.

The steel-plate-reinforcement resin composition can be prepared in the form of a kneaded material by mixing the components cited above in the mixing ratios specified above and kneading them by using a mixing roll, a pressure kneader, or an extruder, for example, through not limited thereto.

To be more specific, the steel-plate-reinforcement resin composition can be prepared in the form of a kneaded material in the following manner, for example. First, the epoxy resin, the acrylonitrile-butadiene rubber, the filler, and the low polar rubber are kneaded by a mixing roll as heated. Then, the kneaded material is cooled down. Thereafter, the curing agent, the curing accelerator, and the foaming agent are added to the kneaded material and then the kneaded material was kneaded further by the mixing roll to thereby prepare the kneaded material.

It is preferable that the kneaded material thus obtained has a flow tester viscosity (60° C., 20 kg load) for example in the range of $5 \times 10 - 5 \times 10^4$ Pa·s, or preferably in the range of $1 \times 10^2 - 5 \times 10^3$ Pa·s.

Thereafter, the kneaded material is rolled for example by calendaring, extrusion, or press molding under temperature under which the foaming agent is not substantially decomposed, to form the resin layer, though this is not particularly limitative. Then, the resin layer thus formed is adhesively bonded to the reinforcing layer. The steel plate reinforcing sheet is produced in this manner.

The resin layer produced by rolling has a thickness for example in the range of 0.4-3 mm, or preferably in the range of 0.5-2.5 mm.

The reinforcing layer serves to provide tenacity for the resin layer after foamed (hereinafter it is referred to "foam layer"). It is preferable that the reinforcing layer is in the form of a sheet and is formed of lightweight and thin-film material to be stuck firmly and integrally with the foam layer. The materials that may be used for the reinforcing layer include, for example, glass fiber cloth, resin-impregnated glass fiber cloth, synthetic resin unwoven cloth, metal foil, and carbon fiber.

The glass fiber cloth is a cloth formed of glass fibers, and a known glass fiber cloth can be used. The resin-impregnated glass fiber cloth is the above-mentioned glass fiber cloth impregnated with synthetic resin such as a thermosetting resin, or a thermoplastic resin, and a known resin-impregnated glass fiber cloth can be used. The thermosetting resins that may be used include, for example, epoxy resin, urethane resin, melamine resin, and phenol resin. The thermoplastic resins that may be used include, for example, vinyl acetate resin, ethylene vinyl acetate copolymer (EVA), vinyl chloride resin, and EVA-vinyl chloride resin copolymer. The thermosetting resin cited above and the thermoplastic resin cited above may be used in combination (e.g. combination of melamine resin and vinyl acetate resin).

The metal foils that may be used include, for example, known metal foils such as an aluminum foil and a steel foil.

Of these materials, the glass fiber cloth and the resin-impregnated glass fiber cloth are preferably used in terms of weight, degree of adhesion, strength, and cost.

The reinforcing layer has a thickness, for example, in the range of 0.05 to 2 mm, or preferably in the range of 0.1-1.0 mm.

The total thickness of the resin layer and reinforcing layer is for example in the range of 0.4-5 mm, or preferably in the range of 0.6-3.5 mm.

If required, a separator (release liner) may be stuck on a surface of the reinforcing layer of the steel plate reinforcing sheet thus obtained.

In the steel plate reinforcing sheet thus obtained, it is preferable that a volume expansion ratio of the steel-plate-reinforcement resin composition used as the reinforcing layer ranges from 1.1 to 5.0 times, or preferably from 1.5 to 3.0 times, when foamed. It is preferable that a density of the foam in the foam layer (weight (g) of foam/volume of foam (g/cm$^3$)) is for example in the range of 0.2-1.0 g/cm$^3$, or preferably in the range of 0.3-0.8 g/cm$^3$.

The steel plate reinforcing sheet of the present invention thus obtained is adhesively bonded to the steel plate used in a variety of industrial machines such as transportation machines and then is foamed and cured, for the reinforcement purpose.

To be more specific, as shown in FIG. 1(a), the steel plate reinforcing sheet of the present invention is formed by laminating the reinforcing layer 1 on the resin layer 2 and, if required, the separator (release liner) 3 is stuck on the surface of the resin layer 2. In use, the separator 3 is striped from the surface of the resin layer 2, as indicated by a phantom line, first. Then, the surface of the resin layer 2 is adhesively bonded to the steel plate 4, as shown in FIG. 1(b). Thereafter, the resulting lamination is heated at a prescribed temperature (e.g. 160-210° C.) to be foamed and cured to form the foam layer 5, as shown in FIG. 1(c).

This steel plate reinforcing sheet of the present invention can be suitably applied for reinforcement of a steel panel of a shell of an automobile for which weight saving is required. In this application to the automotive vehicle, the steel plate reinforcing sheet is adhesively bonded to the steel panel, first, in an assembling process of the steel panel of the shell of the automobile, for example. Then, the steel plate reinforcing sheet adhesively bonded to the steel panel is thermally foamed and cured by using the heat generated at the time of electrodeposition coating, to form the foam layer.

The steel plate reinforcing sheet of the present invention having the resin layer comprising the steel-plate-reinforcement resin composition of the present invention can satisfy both of adhesiveness and handleability even at about room temperature or in a relatively wide temperature range of e.g. 5-35° C., for example. In other words, the steel plate reinforcing sheet of the present invention can allow the steel-plate-reinforcement resin composition to develop the good adhesiveness at low temperature of about 5° C. and can also allow the steel-plate-reinforcement resin composition to develop the good adhesiveness, without making it to too sticky paste, at high temperature of about 40° C., thus making it easy to strip the steel plate reinforcing sheet from the separator and thus achieving improvement in handleability.

Thus, the steel plate reinforcing method of the present invention using this steel plate reinforcing sheet enables the steel plate to be surely reinforced while providing improved handleability in a wide temperature range of about room temperature.

EXAMPLES

While in the following, the present invention will be described in further detail with reference to Examples and Comparative Example, the present invention is not limited to any of them.

Examples and Comparative Example

After the respective components were blended in the blending prescription shown in TABLE 1, they were kneaded by the mixing rolls to prepare the steel-plate-reinforcement resin composition as the kneaded material.

In this kneading process, the epoxy resin, the acrylonitrile-butadiene rubber, the filler, and the low polar rubber were kneaded by the mixing roll as was heated to 120° C. Then, the kneaded material was cooled down to 50-80° C. Thereafter, the curing agent, the curing accelerator, and the foaming agent were added to the kneaded material and then the kneaded material was kneaded further by the mixing roll.

Then, the kneaded material was rolled into a sheet form of 0.6 mm thick by using a press molding machine, to form the resin layer. Then, a glass fiber cloth of 0.2 mm thick serving as the reinforcing layer was stuck on one side of the resin layer, and the separator (release liner) was stuck on the other side of the resin layer opposite to the side thereof on which the reinforcing layer was stuck. The steel plate reinforcing sheet was produced in this manner.

Evaluation:

The reinforcing effect, the handleability, and the adhesiveness of the obtained steel plate reinforcing sheet to an oiled steel plate were evaluated. These evaluations were carried out for all Examples and Comparative Example. The results are shown in TABLE 1.

1) Reinforcing Effect:

After the separator (release liner) of the steel plate reinforcing sheet was peeled off, the steel plate reinforcing sheet was adhesively bonded to an oiled, cold-rolled steel plate (SPCC-SD available from Nippon Testpanel Co., Ltd.) having 25 mm wide, 150 mm long, and 0.8 mm thick under an atmosphere of 20° C. Then, it was heated at 180° C. for 20 minutes to foam the resin layer. The test piece was produced in this manner. The same operation was carried out for all Examples and Comparative Example. The expansion ratios of the respective steel plate reinforcing sheets are shown in TABLE 1.

Then, after the test piece was supported with a span of 100 mm, with the steel plate up, a testing bar was moved down on a lengthwise center portion of the test piece from above in a vertical direction at a rate of compression of 1 mm/min. and was pressed down against the steel plate until the foam layer was bent or displaced by 1 mm and 2 mm from its original position. The strength caused by this bend of the foam layer was taken as a bending strength (N), which was evaluated as the reinforcing effect.

2) Handleability:

Release properties and adhesiveness of the respective steel plate reinforcing sheets of Examples and Comparative Example were evaluated by tactile sensation under the temperature conditions of 5° C., 20° C., and 40° C., respectively.

3) Adhesiveness to Oiled Surface:

Oiled, cold-rolled steel plates (SPCC-SD available from Nippon Testpanel Co., Ltd.) were prepared for the respective steel plate reinforcing sheets. Then, a rust-preventive agent (Daphne Oil Z-5 available from IDEMITSU KOSAN CO., LTD.) was applied to surfaces of the oiled steel plates. Then, the resulting steel plates were rested in upright positions at 20° C. for the duration of a night.

Thereafter, each of the steel plate reinforcing sheets of Examples and Comparative Example was cut into pieces of 25 mm wide and then the separator (release liner) was peeled off therefrom. Then, the respective pieces of the steel plate reinforcing sheet were press-contacted with the rust-preventive-agent-applied surfaces of the respective steel plates by rollers of 2 kg under the atmosphere of 5° C. After 30 minutes passed, a 90° peel test (tensile speed: 300 mm/min.) was carried out to measure the adhesion (N/25 mm), and the measured values were evaluated as the adhesiveness to the oiled steel plate.

TABLE 1

| Blending prescription | | Example 1 | Example 2 | Example 3 | Compa. Ex. 1 |
|---|---|---|---|---|---|
| Epoxy resin | #828 *1 | 80 | 90 | 80 | 80 |
|  | #1001 *2 | — | — | — | 20 |
| Acrylonitrile-butadiene rubber *3 | | 20 | 10 | 20 | — |
| Filler | Talc | 100 | 100 | 100 | 100 |
|  | Calcium carbonate | 50 | 50 | 50 | 50 |
|  | Carbon black | 1 | 1 | 1 | 1 |

TABLE 1-continued

| Blending prescription | | Example 1 | Example 2 | Example 3 | Compa. Ex. 1 |
|---|---|---|---|---|---|
| Low polar rubber | Styrene-butadiene rubber *4 | — | — | 5 | — |
| | Polybutene rubber *5 | — | — | 10 | — |
| Curing agent | Dicyandiamide | 5 | 5 | 5 | 5 |
| Curing accelerator | Ureas *6 | 1 | 1 | 1 | 1 |
| Foaming agent | OBSH | 2 | 2 | 2 | 2 |
| Reinforcing effect (N/25 mm) | 1 mm-displacement strength | 30 | 35 | 30 | 38 |
| | 2 mm-displacement strength | 60 | 68 | 60 | 76 |
| Expansion ratio | | 2 | 2.5 | 2.5 | 2.5 |
| Handleability | 5° C. | Good | Good | Good | No adhesion |
| | 20° C. | Good | Good | Good | Good |
| | 40° C. | Good | Good | Good | Excessively sticky |
| Adhesiveness to oiled surface (N/25 mm) | | 0.1 | 0 | 0.8 | 0 |

*1 #828 Bisphenol A type epoxy resin/Epoxy equivalent: 180 g/eq/Available from Japan Epoxy Resins Co., Ltd.
*2 #1001 Bisphenol A type epoxy resin/Epoxy equivalent: 480 g/eq/Available from Japan Epoxy Resins Co., Ltd.
*3 NBR1042 Acrylonitrile content: 33.5 weight %, Mooney viscosity: 77.5, Available from ZEON CORPORATION
*4 Asaprene 1206 Available from Asahi Kasei Corporation
*5 HV-300 Available from NIPPON PETROCHEMICALS COMPANY, LIMITED
*6 3-(3,4-dichlorophenyl)-1,1-dimethylurea (DCMU) Available from HODOGAYA CHEMICAL CO., LTD.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A steel plate reinforcing sheet comprising:
a resin layer comprising a steel-plate-reinforcement resin composition comprising an epoxy resin, an acrylonitrile-butadiene rubber, a curing agent, a foaming agent, and a low polar rubber for enhancing adhesion to an oiled steel plate surface, wherein the low polar rubber comprises styrene-butadiene rubber and polybutene rubber, or styrene-butadiene rubber; and
a reinforcing layer laminated on the resin layer;
wherein the total thickness of the resin layer and reinforcing layer is in the range of 0.4 to 5 mm;
wherein the steel plate reinforcing sheet is adapted for bonding to an oil adhered surface of a steel plate;
wherein a weight ratio between the epoxy resin and the acrylonitrile-butadiene rubber is between 70:30 and 95:5, such that the acrylonitrile-butadiene rubber is solid rubber which enhances adhesiveness, handleability and reinforcing effect;
wherein the acrylonitrile-butadiene rubber contains 10-50 weight % acrylonitrile;
wherein a mixing ratio of the low polar rubber is 1-100 parts by weight per 100 parts by weight of a total of the epoxy resin and the acrylonitrile-butadiene rubber; and
wherein the adhesiveness develops in a temperature range of about 5° C. to about 35° C.

2. The steel plate reinforcing sheet according to claim 1, wherein the epoxy resin comprises at least one epoxy resin selected from the group consisting of bisphenol A type epoxy resin, bisphenol F type epoxy resin, phenol novolak epoxy resin, cresol novolak epoxy resin, cyclo aliphatic epoxy resin, triglycidyl isocyanurate and hydantoin epoxy resin, hydrogenated bisphenol A type epoxy resin, aliphatic epoxy resin, glycidyl ether epoxy resin, bisphenol S type epoxy resin, biphenyl epoxy resin, dicyclo ring type epoxy resin, and naphthalene epoxy resin.

3. The steel plate reinforcing sheet according to claim 1, wherein the epoxy resin has a viscosity of not more than 250 dPa·s at 25° C.

4. The steel plate reinforcing sheet according to claim 1, wherein the curing agent is a thermally curable curing agent.

5. The steel plate reinforcing sheet according to claim 1, wherein the curing agent comprises at least one compound selected from the group consisting of amine compounds, acid anhydride compounds, amide compounds, hydrazide compounds, imidazole compounds, imidazoline compounds, phenol compounds, urea compounds and polysulfide compounds.

6. The steel plate reinforcing sheet according to claim 1, wherein a mixing ratio of the curing agent is 0.5 to 50 parts by weight per 100 parts by weight of a total of the epoxy resin and acrylonitrile-butadiene rubber.

7. The steel plate reinforcing sheet according to claim 1, wherein the foaming agent is a thermally decomposable foaming agent.

8. The steel plate reinforcing sheet according to claim 1, wherein a mixing ratio of the foaming agent is 0.1 to 30 parts by weight per 100 parts by weight of a total of the epoxy resin and acrylonitrile-butadiene rubber.

9. The steel plate reinforcing sheet according to claim 1, wherein the resin layer further comprises at least one foam auxiliary agent.

10. A steel plate reinforcing sheet comprising:
a resin layer comprising a steel-plate-reinforcement resin composition comprising an epoxy resin, an acrylonitrile-butadiene rubber, a curing agent, a foaming agent, and a low polar rubber for enhancing adhesion to an oiled steel plate surface, wherein the low polar rubber comprises styrene-butadiene rubber and polybutene rubber, or styrene-butadiene rubber; and a reinforcing layer laminated on the resin layer, the reinforcing layer comprising a resin-impregnated glass fiber cloth;

wherein the total thickness of the resin layer and reinforcing layer is in the range of 0.4 to 0.8 mm;

wherein the steel plate reinforcing sheet is adapted for bonding to an oil adhered surface of a steel plate;

wherein a weight ratio between the epoxy resin and the acrylonitrile-butadiene rubber is between 70:30 and 95:5, such that the acrylonitrile-butadiene rubber is solid rubber which enhances adhesiveness, handleability and reinforcing effect;

wherein the acrylonitrile-butadiene rubber contains 10-50 weight % acrylonitrile;

wherein a mixing ratio of the low polar rubber is 1-100 parts by weight per 100 parts by weight of a total of the epoxy resin and the acrylonitrile-butadiene rubber; and wherein the adhesiveness remains effective prior to application of the steel plate reinforcing sheet to the steel plate in a temperature range of about 5° C. to about 40° C.

* * * * *